United States Patent [19]

Sutcliffe et al.

[11] 4,293,507

[45] Oct. 6, 1981

[54] PREPARATION OF SHAPED BODIES

[75] Inventors: Peter W. Sutcliffe, Abingdon; Jim W. Isaacs, Harwell; Robert L. Nelson, Kingston; Colin E. Lyon, Charlton Heights; Brian Stringer, East Hendred, all of England

[73] Assignee: United Kingdom Atomic Energy Authority, London, England

[21] Appl. No.: 39,964

[22] Filed: May 17, 1979

[30] Foreign Application Priority Data

May 26, 1978 [GB] United Kingdom ............... 23671/78

[51] Int. Cl.³ ............................................. G21C 21/02
[52] U.S. Cl. .............................. 264/0.5; 252/301.1 S; 264/56; 264/109
[58] Field of Search .................. 252/301.1 S; 264/0.5, 264/56, 109

[56] References Cited

U.S. PATENT DOCUMENTS 4,016,226 4/1977 Kosiancic ............................. 264/0.5

FOREIGN PATENT DOCUMENTS 38-14800 8/1963 Japan ................................. 264/0.5

*Primary Examiner*—Deborah L. Kyle
*Attorney, Agent, or Firm*—Larson and Taylor

[57] ABSTRACT

There is disclosed a method for the preparation of a shaped body which includes the step of cold pressing a material to give the shaped body, wherein the material has been prepared by means of a gelation process and not substantially comminuted prior to cold pressing.

The shaped body can be heated subsequently to pressing to produce a sintered shaped body.

Preferably the material for pressing, prepared by a gelation process and not substantially comminuted, is a selected physical configuration.

14 Claims, No Drawings

PREPARATION OF SHAPED BODIES

The present invention relates to the preparation of shaped bodies.

In the preparation of shaped bodies by ceramic techniques it can be important to seek to avoid or minimise the presence of dust during processing, partly to reduce loss from the processing cycle but often more importantly to reduce the hazard to health.

Thus, for example, dust hazards can arise where the material to be formed into a shaped body (e.g. by pressing and sintering) has to be handled in a finely subdivided powder form during the preparation of a shaped body.

The health hazard from dust is even more of an acute problem where the dust is a toxic and/or a radioactive material.

It is one object of the present invention to provide a method for the preparation of a shaped body in which process stages at which there is likely to be a dust hazard may be substantially avoided or substantially reduced in number.

According to one aspect of the present invention there is provided a method for the preparation of a shaped body which includes the step of cold pressing a material to give the shaped body, wherein the material has been prepared by means of a gelation process and not substantially comminuted prior to cold pressing.

The shaped body can be heated subsequently to pressing to produce a sintered shaped body.

By "cold pressing" we mean a process in which a material is compacted at ambient (i.e. normal room) temperature. For example, particulate material can be subjected to a uniaxially applied pressure in a die pressing apparatus without heating of the apparatus such that the temperature of the apparatus remains at a value close to normal room temperature. A further example of a cold pressing process is isostatic pressing with a flexible mould at normal room temperature. Cold pressing processes are distinguished from hot pressing processes in that in the latter a temperature elevated significantly above normal room temperature is used.

We prefer that the material for pressing (prepared by a gelation process and not substantially comminuted) has a selected physical configuration.

By "of a selected physical configuration" we mean that the material prior to pressing is a shaped entity or comprises a plurality of shaped entities.

A preferred selected physical configuration is that of a substantially spherical particle and the material for pressing preferably comprises a plurality of substantially spherical particles.

An example of a type of gelation process suitable for use in preparing material for cold pressing into a shaped body in accordance with the present invention is the so-called gel precipitation process. Other gelation processes, such as sol-gel and internal gelation can be used in preparing material for cold pressing in accordance with the present invention, provided that the internal structure of the materials produced by these processes is not inherently unsuitable for pressing.

It will be appreciated that the present invention may provide a method for the preparation of a shaped body in which the material for pressing can be transported and handled in substantially dust-free selected physical configuration form (e.g. as substantially spherical particles).

It is to be understood that the direct product of the gelation process need not necessarily be the material for cold pressing and thus, that the product of the gelation process may need further post-gelation treatment to prepare the material for cold pressing.

Such further post-gelation treatment may involve washing (e.g. with water), ageing (e.g. treatment to modify the crystallinity and structure of the product of gelation), specific drying operations (e.g. by gases optionally containing water vapour or steam or by contacting with organic liquids) and/or heating. In the case of a product of gelation produced by a gel precipitation process heating may be used to effect at least some debonding, if debonding prior to pressing is required. "Debonding" is the process of heating a gel precipitate to remove organic substances (e.g. the gelling agent or a derivative thereof) therefrom.

(Some soluble gelling agents may be removed by use of a suitable solvent.)

The post-gelation treatment (s) may be selected and controlled with the purpose of providing a material having properties which are substantially optimised for cold pressing (and possibly for subsequent sintering) to give a shaped body having desired properties. For example, in one embodiment the production of a shaped body comprising a coherent body of high density (e.g. a solid fuel pellet) may be facilitated if the material to be cold pressed is free flowing (e.g. comprising spheres), is compressible rather than brittle and has porosity where the material has been prepared by a gel precipitation process.

Compressibility in the material (which permits deformation of the material on pressing) may, in the case of a gel precipitate, be achieved by restricting the extent of debonding or omitting debonding prior to pressing.

In another embodiment the material is substantially completely debonded prior to pressing in order to give a friable material which does not retain its original shape on pressing.

As an alternative, given by way of further example, it is believed that a porous shaped body can be prepared by arranging for carbon to operate as a fugitive additive. The carbon could be derived from a gelling agent, or added as carbon (solid or colloidal) prior to formation of the gel precipitate, or both.

British Patent Specifications Nos. 1175834, 1231385, 1253807, 1313750 and 1363532 relate to gel precipitation processes and reference should be made to these for information regarding such processes. B.P. Specification No. 1313750 discloses "modifying agents" which can be used in gel precipitation processes (e.g. in the preparation of particles containing actinide metal species such as uranium and/or plutonium species).

Briefly, in the production of a material for cold pressing by means of one form of the gel precipitation process, a feed solution containing a compound of an element, (typically of a metal) and an organic gelling agent (gelating agent) or agents, is contacted with a precipitating agent to give a gel precipitate containing the element and the gelling agent, or derivative thereof. It will be understood that the element will generally be present in the form of a compound, rather than as the free element. The feed solution may, for example, contain soluble salts as compounds or colloidal dispersions (i.e. sols) of compounds.

The feed solution may also contain other constituents such as a modifying agent as hereinbefore mentioned.

The gel precipitate is conveniently subjected to washing with water and other further post-gelation treatments as hereinbefore disclosed before pressing.

The organic gelling agent enables the feed solution to gel in a coherent manner in the presence of a precipitating agent.

Organic gelling agents can be water soluble high molecular weight polymeric compounds as disclosed in the British Patent Specifications hereinbefore mentioned. In some circumstances gelling agents can be low molecular weight compounds (e.g. glucose or glycerol which are monomeric) but these can normally only be used in gel precipitation feed solutions of low acidity and the wet strength of the gel precipitates produced using them is generally lower than those formed with polymeric gelling agents.

Gelation processes can be used to produce gels in selected physical configurations by contacting the feed solution or sol to be gelled with a gelling agent in an appropriate physical configuration. For example, in the case of gel precipitation, spheres or fibres can be produced by contacting respectively droplets or filaments of the feed solution with a precipitating agent.

Concerning sol-gel processes, these involve the conversion of a colloidal dispersion (a sol) to a gel, for example by either removal of water (i.e. drying) or removal of ions (e.g. anions in the case of alumina or zirconia) which stabilise the dispersion.

The product of gelation produced by a sol-gel process may be subjected to the further post-gelation treatments as hereinbefore disclosed (e.g. ageing, drying and heating) substantially to optimise the properties for cold pressing.

In a sol-gel process the cohesive structure of the product of gelation derives from the interaction of the colloidal units themselves to form a gel. Thus, the use of an organic gelling agent is not essential. However, organic molecules may be added to the colloidal dispersion with a view to modifying the structure of the gel (e.g. to introduce porosity).

Concerning internal gelation, this involves a precipitation from a salt solution in which the reagent for causing the precipitation is generated in situ within a feed solution from a precursor for the reagent (e.g. hexa-methylene tetramine can be incorporated in a feed solution and heated to liberate ammonia as the precipitating reagent).

The product of gelation of an internal gelation process may be subjected to the further post-gelation treatments as hereinbefore disclosed (e.g. ageing, drying and heating) substantially to optimise the properties for cold pressing. These properties may also be controlled by varying the composition of the feed solution. The internal gelation process generally involves the use of a metal salt and a complexing agent for the metal thereof. The properties of the gel can be controlled by controlling the ratios, metal salt:complexing agent:precipitating reagent precursor.

We prefer that the material has been produced by means of a gel-precipitation process.

In one embodiment a gel precipitate is at least partially debonded to provide the material for cold pressing.

Thus, in accordance with an embodiment of the present invention there is provided a method for the preparation of a shaped body which includes the step of cold pressing at least partially debonded, substantially spherical particles of gel precipitate into a shaped body. The shaped body thus produced may be subsequently heated to produce a sintered shaped body.

The degree of debonding of the gel precipitate, if this is carried out prior to pressing, can be controlled with the aim of substantially optimising the properties thereof for cold pressing. (This is in addition to any other treatments with this aim as hereinbefore disclosed.) The properties can be influenced such that the at least partially debonded gel precipitate is still deformable (and porous) and compressible to a sufficient extent to facilitate pressing to the desired shape of body whilst being sufficiently mechanically robust and dense to facilitate handling and the production of dense (i.e. $\geq 80\%$ theoretical density) shaped body. To seek to avoid or reduce problems associated with the removal of carbon from shaped bodies produced by pressing it may in some circumstances be desirable for the gel precipitate to be fully debonded prior to pressing.

Further debonding (if necessary) and sintering can be effected after the shaped body has been formed by the cold pressing.

The present invention finds an application in relation to the handling and transportation of nuclear fuels and nuclear fuel materials (e.g. oxide fuels containing plutonium and uranium).

Thus for example material prepared by means of a gel precipitation process can be transported and handled in an environmentally desirable, substantially dust-free form as a gel precipitate or an at least partially debonded gel precipitate (e.g. as spherical particles) and then cold pressed into the desired shape of fuel body required for particular nuclear applications.

For example, the material can be substantially spherical particles produced by means of a gel precipitation process and these can be cold pressed into a nuclear fuel pellet (e.g. of substantially right-circular cylindrical shape or annular shape) suitable for subsequent sintering to a desired high density.

The present invention also offers the possibility of substantially avoiding or reducing the number of stages at which there is likely to be a dust hazard in forming a shaped nuclear fuel body. For example, it is not necessary to use powdered materials since material prepared by means of a gelation process may be in particulate form and may be fed directly to pressing apparatus. Also the accuracy of pressing operations with materials prepared by means of a gelation process may reduce or obviate the need for shaping of the body after pressing, for example by grinding, and thus obviate further steps likely to produce dust (i.e. pressing may be such that after sintering the body is of the desired shape and size).

Where substantially spherical particles are to be cold pressed in a die arrangement, a higher density of filling of the die and hence higher density of the shaped body may be achieved by use of two or more sizes of spherical particles. Thus where two different sizes are used one size can, for example, have a diameter ten times the diameter of the other.

In addition to the influence of the further post-gelation treatments as hereinbefore disclosed (e.g. washing, ageing, drying and, in the case of a gel precipitate, debonding) the cold pressing properties of a material for cold-pressing can be influenced where the material is in particulate form by the size of the particles.

Furthermore, in the case of a material for cold pressing produced by a gel precipitation process the choice of gelling agent is believed to influence the cold pressing properties.

The gelling agent should preferably be such that it can be removed during debonding and any residual carbon therefrom be capable of subsequent removal. Also the gelling agent should neither give rise to structural nor chemical problems during sintering of the shaped body. If it is desired to reduce the risk of sintering during debonding, the gelling agent may, for example, be chosen to debond at a low temperature (e.g. <700° C.).

Concerning the size of particles, the optimum for pressing will depend upon the chemical composition and the size of the shaped body to be produced by pressing. Generally speaking smaller shaped bodies will require smaller particles, but the particles should not be so small as to present handling problems. The diameter of particles for cold pressing should preferably be at least a factor of 3 smaller than the minimum dimension of the shaped body. A factor of 5 has, for example, been found to be convenient. The choice of particle size may also influence the choice and control of post-gelation treatments hereinbefore disclosed required substantially to optimise the cold pressing properties. To achieve high density (i.e. >80% theoretical density) in the shaped body the size of particles is chosen to achieve a high density of packing prior to and during pressing.

Smaller size tends to lead to more point contacts and a body of higher integrity after sintering.

According to another aspect, the present invention provides a shaped body comprising a cold pressed agglomeration of material, said material having been prepared by means of a gelation process.

According to a further aspect, the pesent invention provides a shaped body comprising a cold pressed, sintered agglomeration of material, said material having been prepared by means of a gelation process.

The invention also provides in a further aspect a shaped body whenever prepared by a method in accordance with the invention.

Suitable binders or internal lubricants (as known in the pressing art) may be used in carrying out pressing in accordance with the present invention.

Examples of shaped bodies prepared in accordance with the present invention are right-circular cylindrical pellets (diameter 5 mm) of (70% U/30% Th) $O_2$ and (70% U/30% Pu) $O_2$. These were produced from substantially spherical particles of (U/Th) $O_2$ and (U/Pu) $O_2$ prepared by debonding a gel precipitate of ammonium diuranate and either thorium hydroxide or plutonium hydroxide of corresponding chemical composition. The gel particles were prepared by contacting appropriate feed solutions with ammonia gas/ammonium hydroxide as the precipitating agent. The appropriate feed solution contained uranyl and thorium or plutonium nitrates, nitric acid, formamide (as a modifying agent) and polyacrylamide (as an organic gelling agent).

The invention will now be further described by way of example only as follows:

EXAMPLE 1

Gel spheres containing ammonium diuranate and thorium hydroxide were prepared by a gel precipitation process in accordance with claim 1 of British Patent Specification No. 1,363,532 (UKAEA).

The feed solution contained uranyl nitrate, thorium nitrate, nitric acid, formamide, polyacrylamide and water in proportions such that after debonding and sintering the resulting product would be substantially (70% U/30% Th) $O_2$.

The feed solution was formed into droplets and gelled with ammonia/ammonium hydroxide using a foam layer. Reference may be made to British Patent Specification No. 1,401,962 (UKAEA) regarding the use of a foam layer in forming gel particles.

The resulting gel spheres (~3 mm diameter) were aged in ammonium hydroxide, subsequently washed in water, and dried by contact with hexanol.

The resulting spheres had a mercury immersion density of 0.81 g cm$^{-3}$ and a carbon tetrachloride immersion density of 3.75 g cm$^{-3}$. These density results imply that the dried gel spheres have internal void fractions of 0.78 (i.e. 78% volume of sphere is pore space).

The gel spheres were debonded by heating in flowing carbon dioxide to 850° C. The resulting debonded spheres (now ~1 mm diameter and having density of 5.3 g cm$^{-3}$) were loaded into a tungsten carbide lined die of 5.93 mm diameter and cold pressed at a load equivilant to 18.6 tons per square inch to give a shaped green pellet right circular cylindrical shape.

The density of this green body was 5.75 g cm$^{-3}$ (as measured geometrically). After sintering in flowing 5% hydrogen in argon at 1600° C., the density had risen to 10.33 g cm$^{-3}$ (97.5% of theoretical density).

EXAMPLE 2

Gel spheres were prepared as disclosed in Example 1 with the exception that they were dried in air after the washing in water.

The void fraction of the dried gel spheres was 0.27.

After debonding as in Example 1 the density was 6.0 g cm$^{-3}$.

After pressing and sintering as in Example 1 a pellet was obtained having a density of 8.7 g cm$^{-3}$.

EXAMPLE 3

Dried gel spheres were prepared in the manner disclosed in Example 1.

The spheres had a mercury immersion density of 1.1 g.cm$^{-3}$ and 65% void volume. The spheres were debonded flowing $CO_2$ at 700° C. to give debonded spheres of density 3.9 g.cm$^{-3}$ (mercury immersion density) which were subsequently pressed in the manner disclosed in Example 1 (with the exception that the pressure was 40 tons per square inch) to give a "green" pellet of 5.23 g.cm$^{-3}$ density.

This pellet was sintered in wet argon to give a pellet of geometric density 10.3 g.cm$^{-3}$.

EXAMPLES 4-6

Dried gel spheres (mercury immersion density 0.934 g.cm$^{-3}$) were prepared in the manner of Example 1 using Pu in place of Th.

Samples of these spheres were debonded in $CO_2$ at different temperatures by raising to temperature and maintaining the temperature for 4 hours.

The samples of spheres were then cold pressed as in Example 1 and subsequently sintered as in Example 1.

Data are given in the following table.

| Example | $T_{max}$ °C. | Debonded Sphere Carbon (wt %) | Density* (gcm$^{-3}$) | Pressing Pressure (t.s.i.) | Green Pellet Density (gcm$^{-3}$) | Sphere Compression in die (%) | Sintered Pellet Density (gcm$^{-3}$) |
|---|---|---|---|---|---|---|---|
| 4 | 650 | 0.17 | 3.14 | 19 | 4.00 | 22 | 9.1 |
| 5 | 700 | 0.09 | 3.57 | 19 | 4.80 | 25 | 9.7 |
| 6 | 760 | 0.02 | 7.8 | 19 | 5.6 | 0 | 9.3 |

*mercury immersion density

EXAMPLE 7

Dried gel spheres containing U/30% Pu were prepared in the manner disclosed in Examples 4 to 6.

The spheres were debonded in a water/argon atmosphere by heating to 700° C. and maintaining temperature for 4 hours. The resulting spheres were cold pressed in the manner of Example 1 and sintered as in Example 1.

Data are given below:

| Debonded Sphere Carbon (wt %) | Density* (g.cm$^{-3}$) | Pressing Pressure (t.s.i) | Green Pellet Density (g.cm$^{-3}$) | Sphere Compression in Die (%) | Sintered Pellet Density (g.cm$^{-3}$) |
|---|---|---|---|---|---|
| 1.58 | 2.72 | 19 | 4.2 | 35 | 9.3 |

EXAMPLE 8

Wet gel spheres containing U/30% Pu were prepared in the manner of Examples 4 to 6 and then steamed for 2 hours before drying with nitrogen gas.

The dried spheres were debonded in $CO_2$ by heating to 850° C. and maintaining that temperature for 4 hours.

The spheres were subsequently cold pressed and sintered in the manner of Example 1.

Data are given below:

| Debonded Sphere Carbon (wt %) | Density (g.cm$^{-3}$) | Pressing Pressure (t.s.i.) | Green Pellet Density (g.cm$^{-3}$) | Sphere Compression in Die (%) | Sintered Pellet Density (g.cm$^{-3}$) |
|---|---|---|---|---|---|
| 0.01 | 9.54 | 25 | 5.6 | 0 | 9.85 |

*Mercury immersion density

EXAMPLES 9 and 10

Two samples of dried gel spheres containing U/30% Pu were prepared in the manner disclosed in Examples 4 to 6 with the exception that the sphere size was 600 mµ diameter after debonding by heating to 790° C. in $CO_2$ and that prior to drying one sample of the spheres was aged as a wet gel for 1 hour in cold water (Example 9) and the other sample was aged as a wet gel for 1 hour in water at 60° C. (Example 10).

The spheres were subsequently cold pressed and sintered as in Example 1.

Data are given below:

| | Debonded Sphere* Density (g.cm$^{-3}$) | Pressing Pressure (t.s.i.) | Green Pellet Density (g.cm$^{-3}$) | Sphere Compression in Die (%) | Sintered Pellet Density (g.cm$^{-3}$) |
|---|---|---|---|---|---|
| Example 9 | 5.24 | 31 | 5.4 | 4 | 9.8 |
| Example 10 | 4.00 | 19 | 5.3 | 25 | 9.3 |

*Mercury immersion density

EXAMPLES 11 to 14

Dry gel spheres were prepared as in Examples 4 to 6 and samples of undebonded spheres were pressed into pellets at various pressures. The resulting pellets were subsequently debonded (by heating to 660° C. in $CO_2$ and maintaining the temperature for 4 hours) and sintered (as in Example 1).

Data are given below:

| Example | Pressing Pressure (t.s.i.) | Green Pellet Density (g.cm$^{-3}$) | Sphere Compression In Die (%) | Debonded Pellet Density (g.cm$^{-3}$) | Sintered Pellet Density (g.cm$^{-3}$) |
|---|---|---|---|---|---|
| 11 | 7 | 2.1 | 55 | 5.9 | 9.8 |
| 12 | 10 | 2.8 | 66 | 6.7 | 9.8 |
| 13 | 17 | 2.9 | 68 | 6.8 | 9.2 |
| 14 | 35 | 3.2 | 71 | 7.4 | 9.6 |

Note:
All densities in Examples 3 to 14 are geometric densities unless otherwise stated.

We claim:
1. A method for the preparation of a shaped body comprising cold pressing a material consisting essentially of gel particles produced by the gel precipitation process to give the shaped body, wherein the material has not been substantially comminuted prior to cold pressing.

2. A method as claimed in claim 1 wherein the shaped body is heated subsequently to pressing to produce a sintered shaped body.

3. A method as claimed in claim 1 wherein the material prior to pressing is in the form of a selected physical configuration.

4. A method as claimed in claim 3 wherein the material prior to pressing comprises a plurality of shaped entities.

5. A method as claimed in claim 4 wherein the shaped entities are substantially spherical particles.

6. A method as claimed in claim 1 wherein prior to pressing the product of gelation is subjected to post-gelation treatment.

7. A method as claimed in claim 6 wherein the product of gelation is subjected to some debonding prior to pressing.

8. A method as claimed in claim 6 wherein the extent of debonding of the product of gelation is restricted, or debonding is omitted, to produce a material for cold pressing which is compressible.

9. A method as claimed in claim 6 wherein the product of gelation is substantially completely debonded prior to pressing to give a friable material.

10. A method as claimed in claim 1 for the preparation of a shaped body including the steps of cold pressing at least partially debonded, substantially spherical particles of gel precipitate into a shaped body.

11. A method as claimed in claim 1 wherein further debonding is effected after the body has been formed by the cold pressing.

12. A method as claimed in claim 1 wherein the shaped body is a nuclear fuel pellet.

13. A method as claimed in claim 12 wherein the nuclear fuel pellet comprises (70% U/30% Th) $O_2$ or (70% U/30% Pu) $O_2$.

14. A method as claimed in claim 1 wherein the product of gelation is subjected to post-gelation treatment prior to cold pressing and post-gelation treatment is selected and controlled to provide a material having properties substantially optimised for cold pressing.

* * * * *